(12) United States Patent
Zhang et al.

(10) Patent No.: US 11,010,130 B2
(45) Date of Patent: May 18, 2021

(54) FLOATING POINT PROCESSOR PROTOTYPE OF MULTI-CHANNEL DATA

(71) Applicant: Shanghai DataCenter Science Co., LTD, Shanghai (CN)

(72) Inventors: Jun Zhang, Shanghai (CN); Ke Xu, Shanghai (CN); Xiaofeng Chen, Shanghai (CN)

(73) Assignee: Shanghai DataCenter Science Co., LTD, Shanghai (CN)

( * ) Notice: Subject to any disclaimer, the term of this patent is extended or adjusted under 35 U.S.C. 154(b) by 183 days.

(21) Appl. No.: 15/739,988

(22) PCT Filed: Aug. 9, 2017

(86) PCT No.: PCT/CN2017/096518
§ 371 (c)(1),
(2) Date: Jan. 5, 2019

(87) PCT Pub. No.: WO2018/223517
PCT Pub. Date: Dec. 13, 2018

(65) Prior Publication Data
US 2019/0129692 A1    May 2, 2019

(51) Int. Cl.
*G06F 7/483* (2006.01)

(52) U.S. Cl.
CPC .................................. *G06F 7/483* (2013.01)

(58) Field of Classification Search
CPC ...................................................... G06F 7/483
USPC ............................................................ 708/514
See application file for complete search history.

(56) References Cited

U.S. PATENT DOCUMENTS

2020/0272795 A1\* 8/2020 Kenney .................... G06J 1/02

FOREIGN PATENT DOCUMENTS

| CN | 105531725 A | \* | 4/2016 | .......... G06K 9/6249 |
| CN | 105721869 A | \* | 6/2016 | |
| CN | 106503659 A | \* | 3/2017 | |
| CN | 106529435 A | \* | 3/2017 | |

\* cited by examiner

*Primary Examiner* — Tan V Mai

(57) ABSTRACT

The present invention discloses a floating point processor prototype of multi-channel data. An architecture comprises the following steps: arranging structural data, semi-structured data and unstructured data into a three-way array; decomposing the three-way array into a matrix pattern of a second-order tensor by using higher-order singular value decomposition; and converting the matrix pattern into a sparse domain to conduct block floating point quantization. A floating point processor prototype of multi-channel data is built.

1 Claim, 1 Drawing Sheet

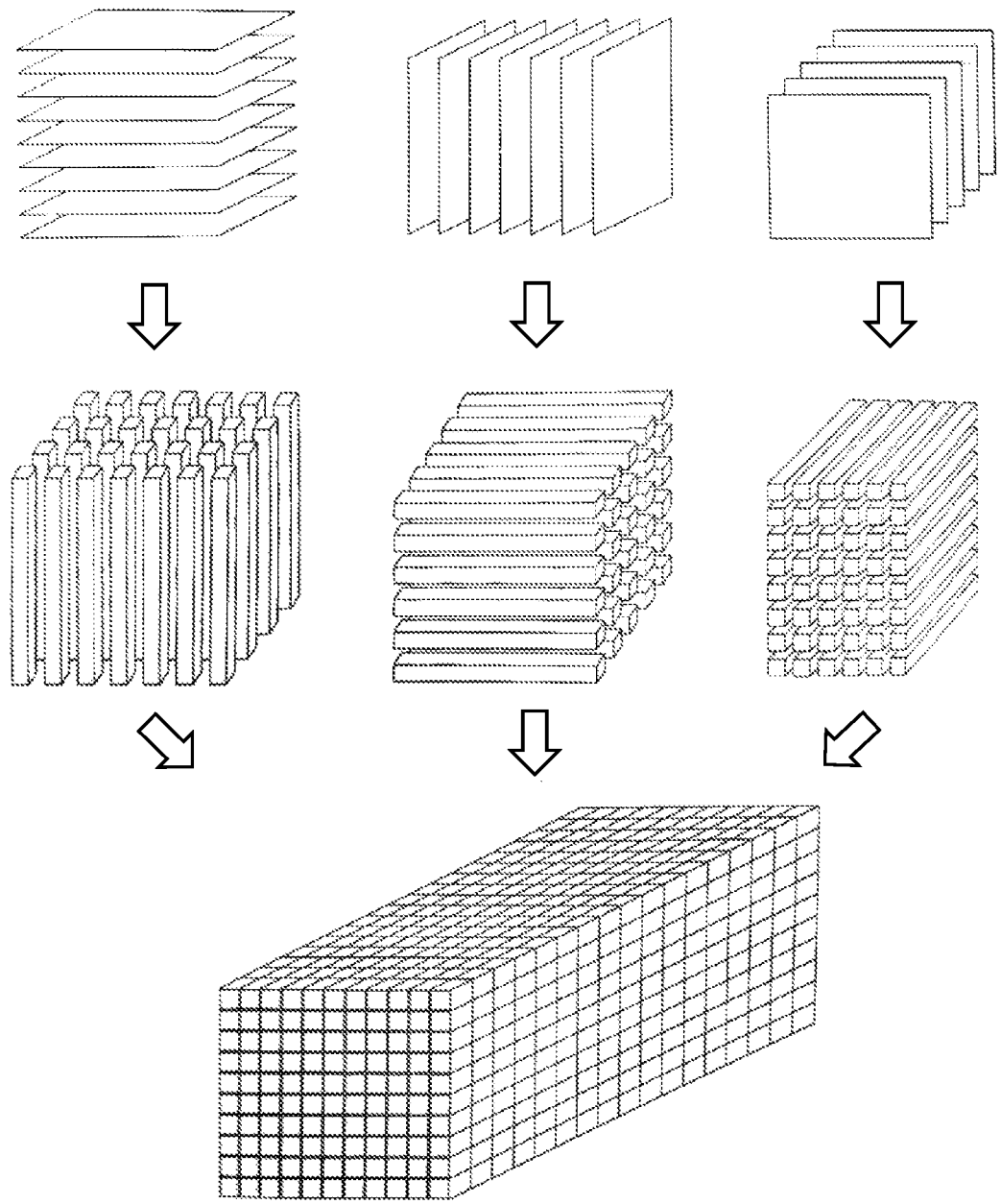

FLOATING POINT PROCESSOR PROTOTYPE OF MULTI-CHANNEL DATA

TECHNICAL FIELD

The present invention relates to a floating point processor prototype of multi-channel data.

BACKGROUND

With cloud computing and virtualization, the characteristics of "large scale", "high density", "high energy consumption", "complexity", etc. are presented. Construction and development of a new generation of data center and improvement of infrastructure management of the data center will become increasingly important. Integrated management and intelligence of an infrastructure architecture of the data center will become a new trend of development of the data center.

An ultra-large data center provides an entire application service from infrastructure to subsequent data analysis, screening and application. Besides data analysis, the ultra-large data center also comprises cloud computing different from a universal service supplied by public cloud and especially serving intelligent manufacturing, as well as supercomputing. As a result, higher requirements are proposed for the processing capability for big data.

Data which can be represented with data or a unified structure is called as structural data, such as digits and symbols. Traditional relational data models and row data are stored in a database, and can be represented with a two-dimensional table structure. Semi-structured data is data between completely structured data (e.g., data in a relational database and an object-oriented database) and completely unstructured data (e.g., sound, image files, etc.). XML and HTML files belong to the semi-structured data. The semi-structured data is generally self-descriptive. Structures and contents of the data are mixed together and are not clearly differentiated. An unstructured database refers to a database in which a field length is variable and a record of each field can be formed by repeatable or unrepeatable subfields. The unstructured database not only can process the structured data (e.g., information including digits, symbols, ec.), but also is more suitable for processing the unstructured data (e.g., information including full text, image, sound, film and television, hypermedia, etc.).

Arrangement of data along the same direction is called as a one-way array. A scalar is a representation of a zero-way array. Row vectors and column vectors are respectively one-way arrays of data arranged along a horizontal direction and a vertical direction. A matrix is a two-way array of data arranged along two directions including the horizontal direction and the vertical direction. A tensor is a representation of multi-way arrays of data, and is an extension of the matrix. The most commonly used tensor is a third-order tensor. The third-order tensor is also called as a three-dimensional matrix. Square third-order tensors with the same dimensions are called as cubes.

Three-way arrays of the third-order tensors are not commensurate in the row vector and the column vectors, and are renamed as tensor fibers. A fiber is a one-way array obtained by making only one subscript variable and keeping all other subscripts unchanged. The tensor fibers are respectively a horizontal fiber, a vertical fiber and a longitudinal fiber of the third-order tensor. A high-order tensor can also be represented by a matrix set. The matrices form a horizontal slice, a lateral slice and a front slice of the third-order tensor. In analysis and calculation of the tensor, a third-order tensor (three-way array) can be reorganized or rearranged to become a matrix (two-way array).

The matrix has two concomitant vector spaces: a column space and a row space. Singular value decomposition orthogonalize the two vector spaces, and decomposes the matrix into a product of three matrices: a left singular matrix, a right singular matrix and a middle diagonal singular value matrix. Since the effect of the singular value is often more important than the effects of the left singular vector and the right singular vector, a singular value matrix can be regarded as a core matrix of the matrix. If a diagonal singular value matrix is regarded as a second-order tensor, the singular value matrix is naturally a core tensor of the second-order tensor, while the product of the three matrices of the matrix can be changed to an n-mode product of the second-order tensor.

A sparse signal refers to a signal that values are equal to zero or approximately equal to zero at most sampling moments and values are obviously not equal to zero at fewer sampling moments only. Many natural signals are not sparse signals in a time domain, but are sparse in a certain transformation domain. Transformation tools include Fourier transformation, short-time Fourier transformation, wavelet transformation, Gabor transformation, etc.

A block floating point algorithm is as follows: data is grouped; the data in the group is scaled up and down relative to each other, but cannot be scaled up and down with members of other groups in the same proportion even for simple mathematical operation such as multiplication. In a complicated matrix inversion condition, a block floating point processor must be adopted if complicated mathematical operation needs to be compared between groups.

A block floating point quantification algorithm is based on the fact that the entropy of the data is lower than the entropy of the entire data set at a small time interval. A block floating point quantizer is a device of an effective representation form, which can output a data flow and uniformly quantify sampled data into original data. The process of quantification only requires that a bit number is less than the number of samples.

The present invention provides a floating point processor prototype of multi-channel data. An architecture comprises the following steps: arranging structural data, semi-structured data and unstructured data into a three-way array; decomposing the three-way array into a matrix pattern of a second-order tensor by using higher-order singular value decomposition; and converting the matrix pattern into a sparse domain to conduct block floating point quantization. A floating point processor prototype of multi-channel data is built.

SUMMARY

The purpose of the present invention is to provide a block floating point quantization architecture of multi-channel data. The present invention comprises the following features:

Technical Solution of the Invention

1. A block floating point quantization architecture of multi-channel data comprises:
    1) arranging structural data, semi-structured data and unstructured data into a three-way array;

2) decomposing the three-way array into a matrix pattern of a second-order tensor by using higher-order singular value decomposition; and 3) converting the matrix pattern into a sparse domain to conduct block floating point quantization.

2. In the architecture according to claim 1, a floating point processor prototype of multi-channel data is built.

DESCRIPTION OF DRAWINGS

FIG. 1 is a diagram of a floating point processor prototype of multi-channel data.

DETAILED DESCRIPTION

The floating point processor prototype of multi-channel data comprises the following steps:

1) arranging structural data, semi-structured data and unstructured data into a three-way array;

2) decomposing the three-way array into a matrix pattern of a second-order tensor by using higher-order singular value decomposition;

3) converting the matrix pattern into a sparse domain to conduct block floating point quantization; and 4) building a floating point processor prototype of multi-channel data.

What is claimed is:

1. A super computing method by using block floating point quantization architecture of multi-channel data, comprising:

1) arranging structural data, semi-structured data and unstructured data in the database into a three-way array;

2) decomposing the three-way array into a matrix pattern of a second-order tensor through a higher-order singular value decomposition;

3) converting, by a block floating point quantizer, the matrix pattern into a sparse domain to conduct block floating point quantization; and 4) applying super computing on the matrix pattern after the block floating point quantization;

wherein the structural data comprise digits and symbols; the semi-structured data comprises XML and HTML files and the unstructured data comprises full text, image, sound, film and television, hypermedia.

* * * * *